(12) United States Patent
Barkey et al.

(10) Patent No.: US 9,117,032 B2
(45) Date of Patent: Aug. 25, 2015

(54) FACILITATING ROUTING BY SELECTIVELY AGGREGATING CONTIGUOUS DATA UNITS

(75) Inventors: Kathy S. Barkey, Kingston, NY (US); Howard M. Haynie, Wappingers Falls, NY (US); Jeffrey M. Turner, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 409 days.

(21) Appl. No.: 13/151,069

(22) Filed: Jun. 1, 2011

(65) Prior Publication Data

US 2012/0311180 A1    Dec. 6, 2012

(51) Int. Cl.
*G06F 15/173*     (2006.01)
*G06F 13/36*     (2006.01)
*G06F 13/38*     (2006.01)

(52) U.S. Cl.
CPC ...... *G06F 13/385* (2013.01); *G06F 2213/0058* (2013.01); *G06F 2213/3808* (2013.01)

(58) Field of Classification Search
CPC .......... G06F 13/385; G06F 2213/0058; G06F 2213/3808
USPC ........................................................ 709/238
See application file for complete search history.

(56) References Cited

U.S. PATENT DOCUMENTS

| 6,757,791 | B1 | 6/2004 | O'Grady et al. |
| 2002/0152335 | A1 | 10/2002 | Holm et al. |
| 2003/0043636 | A1 | 3/2003 | Zitlaw et al. |
| 2003/0223361 | A1 | 12/2003 | Hussain et al. |
| 2004/0003164 | A1 | 1/2004 | Boily |
| 2006/0080455 | A1 | 4/2006 | Das et al. |
| 2006/0195644 | A1 | 8/2006 | Arndt et al. |

(Continued)

FOREIGN PATENT DOCUMENTS

| CN | 101251789 A | 8/2008 |
| CN | 101464836 A | 6/2009 |

(Continued)

OTHER PUBLICATIONS

Notification of Transmittal of the International Search Report and Written Opinion issued for International Application Serial No. PCT/IB2012/052298, dated Sep. 13, 2012.

(Continued)

*Primary Examiner* — Shripal Khajuria
*Assistant Examiner* — Farhad Ali
(74) *Attorney, Agent, or Firm* — Steven Chiu, Esq.; Kevin P. Radigan, Esq.; Heslin Rothenberg Farley & Mesiti P.C.

(57) ABSTRACT

Aggregation of contiguous data packets, such as contiguous I/O adapter stores, is disclosed. Commensurate with receiving data packets to be written to a memory, multiple contiguous data units of the data packets are aggregated into an aggregated data block. The aggregated data block is validated for writing to memory responsive to either the aggregated data block reaching a size which with inclusion of a next contiguous data unit in the aggregated data block would result in the aggregated data block exceeding a configurable size limit, or a next data unit of the plurality of data units to be written to memory being non-contiguous with the multiple contiguous data units.

13 Claims, 7 Drawing Sheets

(56) References Cited

U.S. PATENT DOCUMENTS

| | | |
|---|---|---|
| 2006/0212870 A1 | 9/2006 | Arndt et al. |
| 2006/0288125 A1 | 12/2006 | Boyd et al. |
| 2007/0079044 A1* | 4/2007 | Mandal et al. ............... 710/310 |
| 2007/0110046 A1 | 5/2007 | Farrell et al. |
| 2008/0168461 A1 | 7/2008 | Arndt et al. |
| 2009/0122797 A1 | 5/2009 | Thubert et al. |
| 2009/0213857 A1 | 8/2009 | Haynie et al. |
| 2009/0225665 A1 | 9/2009 | Haynie et al. |
| 2009/0238190 A1 | 9/2009 | Cadigan, Jr. et al. |
| 2010/0306417 A1 | 12/2010 | Stephens et al. |
| 2010/0322237 A1 | 12/2010 | Raja et al. |
| 2011/0019550 A1* | 1/2011 | Bryers et al. ................ 370/235 |

FOREIGN PATENT DOCUMENTS

| | | | |
|---|---|---|---|
| CN | 101556557 A | | 10/2009 |
| CN | 1286442 A | | 3/2011 |
| EP | 1 750 202 A1 | | 2/2007 |
| EP | 1848172 A1 | | 10/2007 |
| JP | 2007281721 A | | 10/2007 |
| WO | WO2010012304 A1 | | 4/2010 |

OTHER PUBLICATIONS

Li, Tianji et al., "Aggregation With Fragment Retransmission for Very High-Speed WLANs," Apr. 2009.

Examination Report for Application No. GB1319324.8, dated Nov. 21, 2013 (5 pages).

Supplemental Examination Report for Application No. GB1319324.8, dated May 7, 2014 (3 pages).

Kathy S. Barkey et al., Office Action for U.S. Appl. No. 13/664,820, filed Oct. 31, 2012 (U.S. Publication No. 2013/0060963 A1) dated Dec. 18, 2014 (43 pages).

Kathy S. Barkey et al., Office Action for U.S. Appl. No. 13/664,820, filed Oct. 31, 2012 (U.S. Publication No. 201310060963 A1) dated Apr. 8, 2015 (26 pages).

* cited by examiner

FACILITATING ROUTING BY SELECTIVELY AGGREGATING CONTIGUOUS DATA UNITS

BACKGROUND

Currently, handling of data packets of arbitrarily packetized data received from a generic I/O adapter by, for example, a virtualization router can be inefficient since the router must perform address translation prior to storing the data to system memory. A problem can arise because the generic I/O adapter functions without regard for system cache-line boundaries, resulting in a likelihood of forwarded packets being misaligned, which can in turn cause the virtualization router to perform inefficiently. In particular, address translation is often employed with I/O, for example, when virtualizing I/O adapters. Modern I/O adapters attempt to optimize performance by aligning storage requests at cache-line sizes on cache-line boundaries. However, if the address translation takes place outside of the adapter, it is likely that the accesses will be misaligned with the target system's cache-line boundaries. The resulting misalignment can cause significant performance degradation.

BRIEF SUMMARY

The shortcomings of the prior art are overcome and additional advantages are provided through the provision of a network component comprising a router configured to perform a method, the method comprising: receiving a plurality of data units to be routed; aggregating multiple contiguous data units of the plurality of data units into an aggregated data block; and validating the aggregated data block for routing responsive to one of: the aggregated data block reaching a size which with inclusion of a next contiguous data unit would result in the aggregated data block exceeding a configurable size limit; or a next data unit of the plurality of data units being non-contiguous with the multiple contiguous data units.

In another aspect, a method is provided which comprises: receiving a plurality of data units to be routed; aggregating multiple contiguous data units of the plurality of data units into an aggregated data block; and validating the aggregated data block for routing responsive to one of: the aggregated data block reaching a size which with inclusion of a next contiguous data unit would result in the aggregated data block exceeding a configurable size limit; or a next data unit of the plurality of data units being non-contiguous with the multiple contiguous data units.

In a further aspect, a computer program product is provided which comprises a computer-readable storage medium readable by a processor and storing instructions for execution by the processor to perform a method, the method comprising: receiving a plurality of data units to be routed; aggregating multiple contiguous data units of the plurality of data units into an aggregated data block; and validating the aggregated data block for routing responsive to one of: the aggregated data block reaching a size which with inclusion of a next contiguous data unit would result in the aggregated data block exceeding a configurable size limit; or a next data unit of the plurality of data units being non-contiguous with the multiple contiguous data units.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Generally stated, disclosed herein is a router with an aggregator or aggregation processing for combining multiple contiguous data units of, for example, multiple data packets to be written to memory, into a single aggregated data block for writing to the memory. In one embodiment, the single aggregated data block can be validated and forwarded for address translation using a single header command. Validating of the aggregated data block can occur responsive to the aggregated data block reaching a size which with inclusion of a next contiguous data unit in the aggregated data block would result in the aggregated data block exceeding a configurable size limit, or a next data unit of the plurality of received data units to be written to memory being non-contiguous with the multiple contiguous data units.

Figure 1:
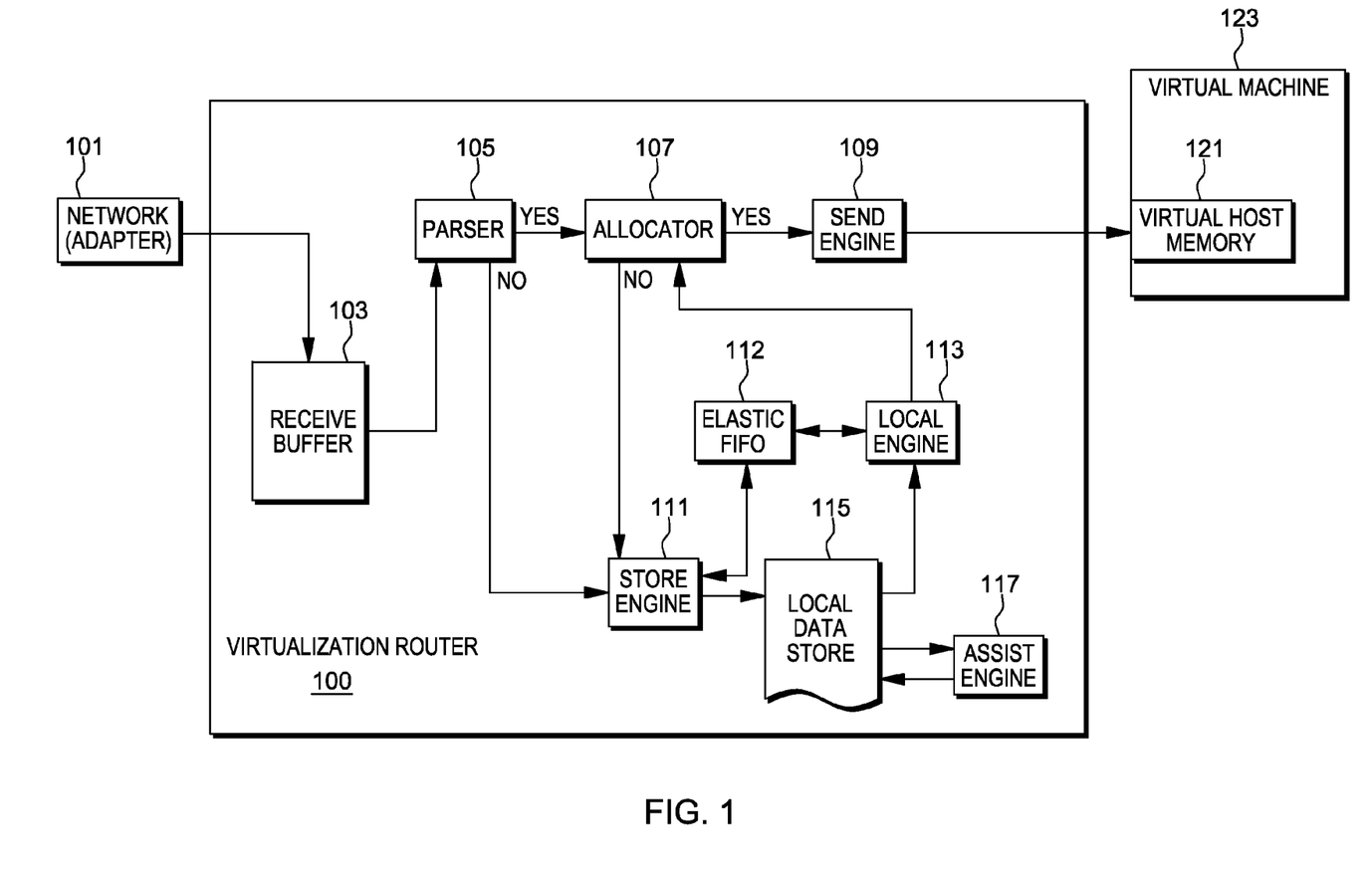
FIG. 1 is a block diagram illustrating one embodiment of a computer system which may be modified to include a data unit aggregator to facilitate flow of data packets to memory of a host, in accordance with one or more aspects of the present invention.

FIG. 1 is a block diagram illustrating one embodiment of a computer system which may be modified to include a data unit aggregation facility to facilitate flow of data to memory, in accordance with one or more aspects of the present invention. In one embodiment, the computer system comprises a virtualization router 100, wherein data packets are received into a receive buffer 103 from a network adapter 101. A parser 105 examines each packet's headers (for example, layer 2, layer 3, etc.), and a test is performed to determine whether a destination connection can be determined for the received packet. If so, processing determines whether one or more connection-specific resources required to send the packet to, for example, a virtual host memory 121 corresponding to the destination connection are available. The one or more connection-specific resources are available if they can be obtained for allocation by a resource allocation mechanism such as an allocator 107. For example, allocator 107 attempts to obtain one or more connection-specific resources required to send that packet to a virtual machine 123 that corresponds to the destination connection. Note that the terms "virtual machine" and "virtual host" are used interchangeably herein.

Although the example of FIG. 1 depicts one virtual machine 123, this is for purposes of example only, since the system may contain a plurality of virtual machines. For example, a practical system may include hundreds or thousands of virtual machines. With hundreds or thousands of virtual machines running on a single physical host, there may be scattered shortages of resources for some small subset of the virtual machines at any given time. Within the physical machine, a hypervisor may allocate different resources to different virtual machines. For example, some virtual machines may have higher priority, and therefore get more time-slices than others. Or, some virtual machines may have more physical storage allocated for use as receive buffers. A real world system hosting thousands of virtual machines may not operate perfectly at all times with regard to resource management. Likewise, scattered resource shortages may be attributed to the inherently bursty nature of network traffic, such as Ethernet traffic.

In one embodiment, a local engine 113 blocks allocator 107 from allocating resources to new packets when packets for the same connection already exist within an elastic First In, First Out (FIFO) 112 memory because of a previous lack of resources. If allocator 107 is successful in obtaining the resources, a send engine 109 writes the packet to a virtual host memory 121 associated with the virtual machine 123. If parser 105 does not determine the packet's connection, it passes the packet to a store engine 111. If the allocator 107 fails in its attempt to attain the required resources (which could be because the resources are unavailable or because the local engine currently has priority access to those resources), the allocator 107 passes the packet to the store engine 111.

For each packet it is to service, store engine 111 obtains a free packet buffer from the elastic FIFO 112. A free packet buffer is an empty packet-sized block of memory in a local data store 115. Store engine 111 moves the packet into that buffer and submits the used buffer to the elastic FIFO 112. If a free packet buffer resource is not available, the packet is dropped or, optionally, the store engine 111 can wait for that shared resource to become available provided sufficient buffering, such as the receive buffer, is available. Since a packet's connection must be determined before it can be sent to the virtual host memory 121, assist engine 117 determines and assigns connections to packets that were submitted to the elastic FIFO 112 without known connections (i.e., those packets which arrived from parser 105).

Local engine 113 continuously or periodically or repeatedly monitors both allocator 107 for connection-specific resources and the elastic FIFO 112 for the presence of packets with known destination connections. When resources become available for a connection which had previously lacked resources, the local engine 113 gains exclusive access to those resources, via allocator 107, until no more packets for that connection exist in the elastic FIFO 112. When a connection with both waiting packets and available resources is seen, the packet is removed from the local data store 115 and passed to allocator 107. Allocator 107 allocates the connection-specific resources required to send that packet to virtual machine 123 corresponding to the connection destination. Since the local engine 113 already determined that the resources were available and claimed them for the packet, allocator 107 is successful and the packet is written to virtual host memory 121 by send engine 109.

Receive buffer 103, parser 105, allocator 107, send engine 109, store engine 111, local engine 113, local data store 115, elastic FIFO 112, and assist engine 117 together comprise the virtualization router 100. In this routing embodiment, router 100 is referred to as a virtualization router because it supports communication channels to a plurality of virtual machines which are called destination connections, such as virtual machine 123, providing the illusion to each virtual machine 123 that it possesses its own network interface card (such as the network adapter 101), when in fact, only a single high-speed adapter (i.e., network adapter 101) is present. Network adapter 101 is run in promiscuous mode to receive all packets off the network. The router 100 determines the correct connection for each packet and moves the packet to a memory space (e.g., virtual host memory 121) of a corresponding virtual machine 123.

In one embodiment, receive buffer 103 contains a virtual receive address space for each packet the network adapter 101 will store. These address spaces are contiguous blocks of memory, as seen by the network adapter, but can be located anywhere in the receive buffer 103. Further, the addresses are not associated with any virtual machine. Send engine 109 translates these virtual receive addresses into the virtual host memory 121 address space belonging to the virtual machine 123. The virtual receive address space will in general not be aligned with the virtual host memory address space. Thus, the aggregator or aggregation processing disclosed herein functions, in part, to selectively reconfigure (in one embodiment) storage requests to enhance storage performance.

Figure 2:
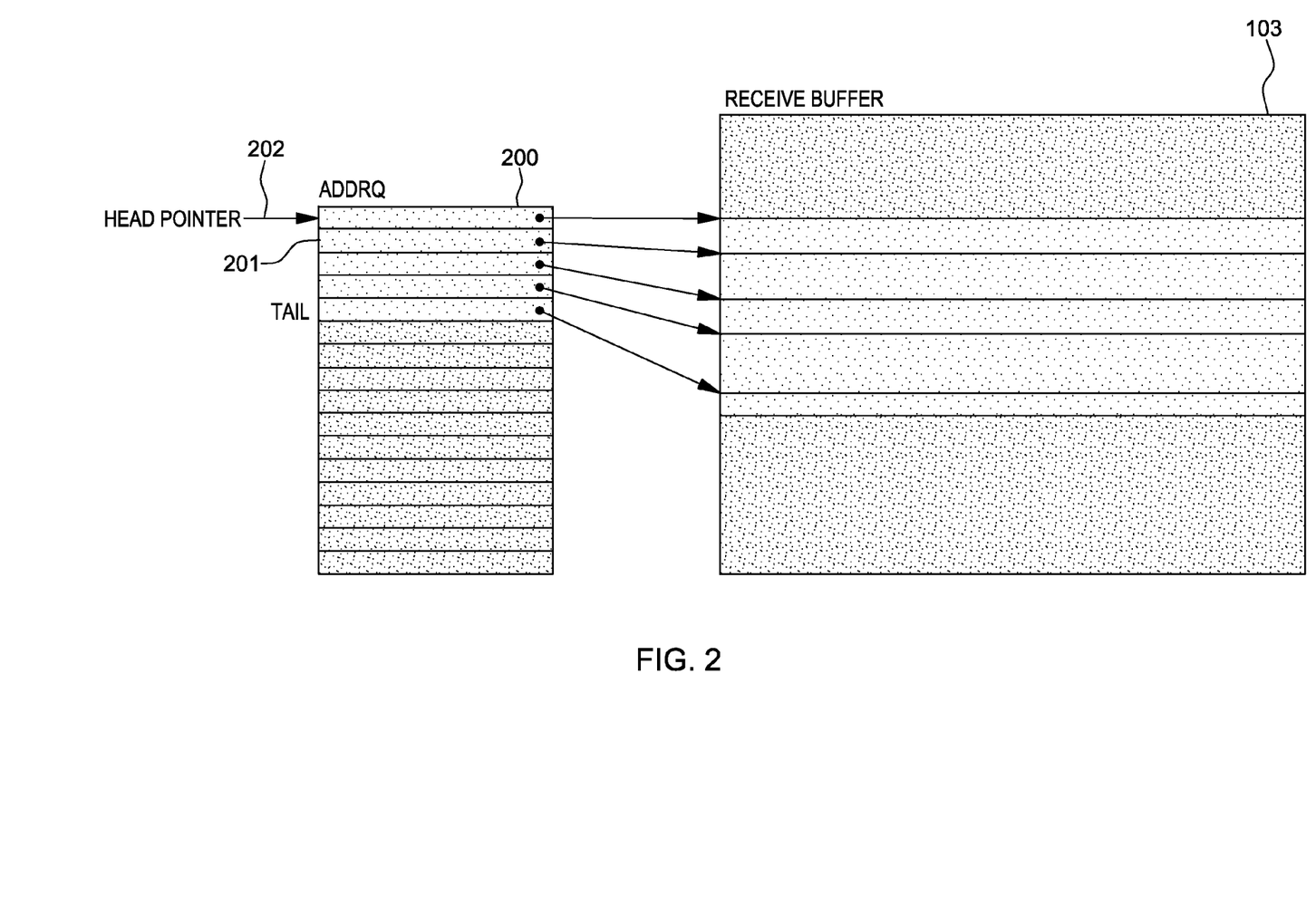
FIG. 2 is a data structure diagram setting forth an illustrative receive buffer for use with the router of FIG. 1, in accordance with one or more aspects of the present invention.

FIG. 2 depicts a data structure diagram setting forth an illustrative receive buffer 103 for the system of FIG. 1. Incoming data packets are initially written directly into receive buffer 103, which is managed with a queue of records called an addrq 200. Each record 201 contains various information about a data packet, including a pointer into receive buffer 103, where the data was written. All packets are removed from the receive buffer in the same order that they were previously written (that is, as the packets arrive from network adapter 101 (FIG. 1)). If the packet at the head of the addrq 200 (as indicated by a head pointer 202) is not a type of packet that requires special handling, and if all the required resources are available to move the packet, the packet is sent directly to its connection destination (e.g., virtual host memory 121 (FIG. 1)). Otherwise, if the packet is a special type or, in one embodiment, if one or more of the resources are not available, the packet is sent to the elastic FIFO 112 (FIG. 1).

As head pointer 202 moves forward (i.e., in a downward direction in FIG. 2), packets for connections with ample resources continue to be sent directly to their connection destinations, even while packets for other connections without resources are sent to the elastic FIFO 112 (FIG. 1). Similarly, by the same mechanism, packets that do not require special consideration can be sent directly to their destination, while packets that require extra processing (e.g., broadcast packets) can be sent to the elastic FIFO 112 to be serviced by an independently running assist engine. In this way, the flow of all packets continues through router 100 (FIG. 1) consistently without stalls or hesitations.

As noted, a problem being addressed by the aggregation processing disclosed and claimed herein is the existing inefficient handling of data packets of arbitrarily packetized data received from a generic input/output (I/O) adapter by, for example, a virtualization router that must perform address translation prior to storing the data to system memory. The problem arises because the I/O adapter functions without regard for system cache-line boundaries, resulting in a significant likelihood of the forwarded packets being misaligned, causing the virtualization router to perform inefficiently. One approach to addressing this problem would be to employ a complex system of queues and multiple buffer spaces to reorder the arbitrary packets of data into larger contiguous blocks. However, such a solution cannot be readily incorporated into an existing routing system without modification to the existing system (e.g., the I/O adapter, receive buffer, and/or router logic blocks). In addition, such a complex solution would necessarily insert latency due to the "store and forward" nature of the approach for handling the inbound data.

In one embodiment, as part of the routing process, address translation is performed by the virtualization router (e.g., by send engine 109 (FIG. 1)) prior to sending the data packets to their destinations. Existing I/O adapters attempt to optimize performance by aligning storage requests at cache-line sizes on cache-line boundaries of the destination system. However, if the address translation takes place outside of the adapter, it is likely that the accesses will be misaligned with the target system's cache-line boundaries. The resulting misalignment can cause significant performance degradation.

Advantageously, by examining the addresses of store commands from the adapter, it can be determined when a series of stores describe contiguous data. Translating these stores individually can be inefficient, particularly when the packets' arbitrary payloads straddle the target system's cache-line boundaries. Disclosed herein, therefore, is an aggregator or aggregation process which improves handling efficiency of those packets, prior to address translation, by selectively aggregating contiguous data units of the packets.

Figure 3:
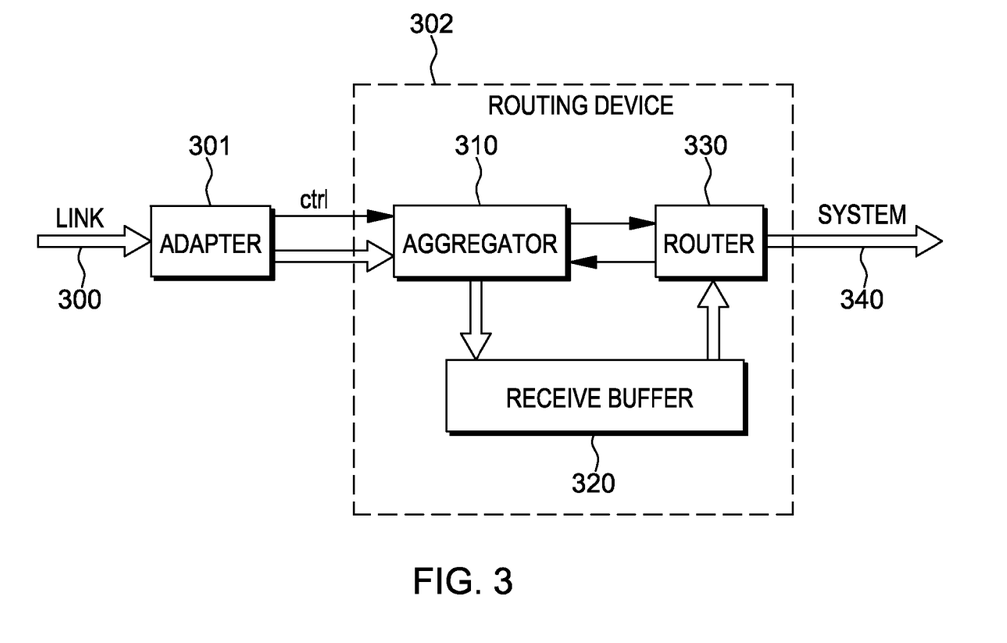
FIG. 3 depicts a high-level embodiment of a computing system (such as the computer system of FIG. 1) with an aggregator which aggregates contiguous data units to facilitate flow of data to memory, for example, of a virtual host, in accordance with one or more aspects of the present invention.

FIG. 3 illustrates one embodiment of a computing system which includes a routing device 302 comprising an aggregator 310 (in accordance with one or more aspects of the present invention), which is added to manage the flow of data to improve performance of a virtualization router 330 that is attached to a generic I/O adapter 301. As illustrated, data packets are received across a link (or network) 300 via an adapter 301, which forwards the data packets and appropriate control commands to aggregator 310 and receive buffer 320. Once validated, the data packets are forwarded from receive buffer 320 by a router 330 to the destination system 340 in a manner, for example, such as described above. Aggregator 310 comprises, in one embodiment, management logic or processing to improve performance of the virtualization router attached, for example, to a generic I/O adapter.

Given that it is likely that sequential packets output by the generic I/O adapter will tend to carry data units bound for memory regions contiguous with their preceding and following packets, the insertion of aggregation processing (or aggregator) into the routing flow can reduce the translation burden on the router by allowing a reduced number of store commands (of larger blocks of data) to system memory to be processed, thus improving overall efficiency. Note that the aggregation processing described herein is based on the state or needs of the router, and the contiguous nature of the data packets. Note also that the processing disclosed herein does not attempt to manipulate the packet reception order, and does not include any actions on or special handling of, non-contiguous packets. Further, the processing disclosed hereinbelow has no temporal dependencies, that is, the aggregation processing is non-time-based.

Advantageously, performance improvement is achieved in specific incoming packet scenarios, without affecting the data path to the receive buffer, or decreasing performance in the non-specified scenarios. In addition, the processing disclosed herein can advantageously be applied to existing router designs with minimal modification.

Figure 4:
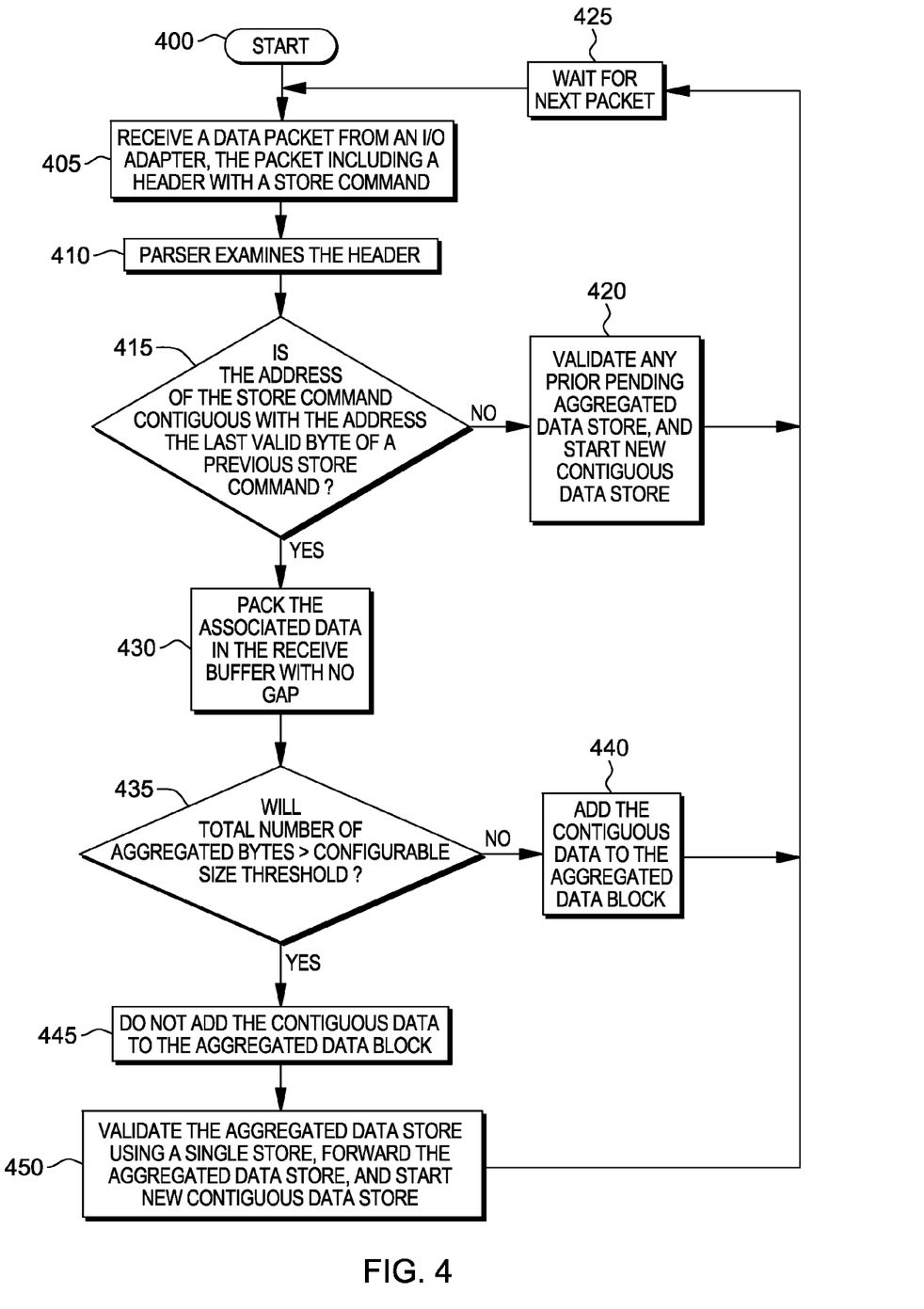
FIG. 4 depicts one embodiment of processing for aggregating contiguous data units, in accordance with one or more aspects of the present invention.

The aggregator or aggregation processing disclosed herein effectively re-aligns (in one embodiment) storage requests between (for example) the two address maps to optimize storage performance, by aggregating multiple smaller incoming store commands into a larger contiguous write command within the receive buffer. One example of this processing is depicted in FIG. 4.

Aggregation processing starts 400 with receiving a data packet from (for example) a generic I/O adapter, wherein it is assumed for this discussion that the data packet includes an address with (or in) a store command 405. In one specific example described herein, the data packets are PCI-express data packets, which include a header with the associated address information. However, the concepts disclosed herein apply generically to any data packet with an address in the store command.

A parser examines the address in the store command 410, and the aggregator determines whether the address of the store command is contiguous with the address of the last valid byte of a previous store command 415. If "no", then any prior pending store of multiple contiguous data units is validated for forwarding, and the current, non-contiguous data store is held for possible aggregation with a subsequently received data packet 420. That is, the current, non-contiguous data store may itself be the start of a new aggregated data block.

Assuming that the address of the store command is contiguous with the address of the last valid byte of a previous store command, then the aggregator combines the two consecutive store commands, and the associated data units are packed into the receive buffer with no gap 430. Prior to the received store command becoming a seamless continuation of the previous store command, processing determines whether the block of aggregated data block has reached a size which with inclusion of the current contiguous data unit in the aggregated data block would result in the aggregated data block exceeding a configurable size limit (or threshold) 435. If "no", then the contiguous data unit is added to the aggregated data block 440, and processing waits for the next data packet 425 to be received into the receive buffer. Note that setting the configurable size limit to a token value (for example, zero bytes) results in a write for every data store, that is, it effectively disables the aggregation processing. In this situation, a flush event (described below), serves no purpose when the configurable size limit (or threshold) equals the token value.

A particular store command is identified as being the last store command of an aggregation when the next store would cause the total combined data size (e.g., byte count) to exceed the configurable size limit. If so, then the aggregator does not add the contiguous data unit to the aggregated data block 445, and the aggregated data store is validated using, for example, a single stored header for forwarding from the receive buffer 450. The router mechanisms that perform the address-translation and movement of the data to its destination within the system are signaled when the header is valid. The header is validated when all the data for the last store has been written to the receive buffer. In this scenario, the next store is held as the potential start of a new contiguous data store, and after validation of the prior pending aggregated data block, processing waits for a next data packet 425.

Note that, since it is possible for a break between two data stores to fall at any byte line, any partial-line write at the end of a previous accumulated data store may be held instead of written, until the remainder of that line is available with a next contiguous data store. This avoids the necessity for partial byte-enables to accompany writes to the receive buffer. In that case, the partial ending line of the latest store is also saved throughout the duration of the following store, in case that store is "nullified", as explained below. In an alternate implementation, if the next incoming data unit is non-contiguous, or will result in exceeding the configurable size limit, or if a flush event occurs before the next data unit is received, then the partial ending line may be written alone.

When the configurable size limit (or threshold) is set to some reasonably large, non-zero value, there is no limit to how long the aggregator may wait for a next store command in order to determine whether the previous store was the last in a series of combined data stores. The aggregator is allowed to wait indefinitely in accordance with this processing, because the router has the ability to tell the aggregation logic to "flush" the last write, by sending a flush command. As long as the router has not yet serviced every header that is already valid, the router will likely not be concerned that the aggregation logic has not yet validated an in-progress header.

Figure 5:
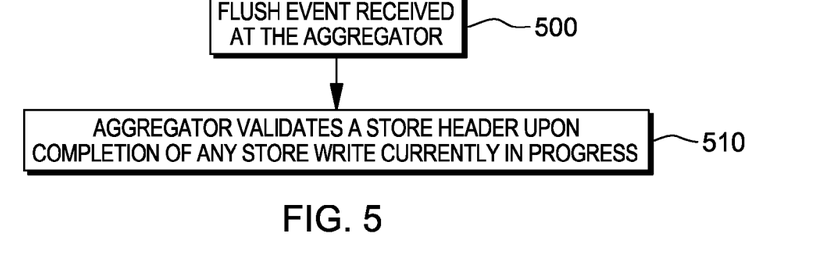
FIG. 5 depicts one embodiment of flush event processing which may be employed in combination with aggregation processing of FIG. 4, in accordance with one or more aspects of the present invention.

FIG. 5 illustrates one embodiment of flush event processing. A flush event is received by the aggregator 500, and responsive to the flush event, the aggregator validates a store header upon completion of any store write currently in progress 510. A flush command from the router is one example of a flush event which causes the aggregator to complete any receive buffer write operation currently being held. This results in a timely validation of the corresponding header. If a flush command reaches the aggregator while a store write is in progress, the aggregator logic does not wait for additional contiguous data at the end of the particular store, but rather immediately validates the corresponding header upon completion of that write (provided the store is not nullified). If a partial ending line is being held, it is written. If the aggregator is idle, that is, nothing is pending, the flush command does nothing, that is, the router's FIFO of headers to be serviced appropriately became empty because no stores were taking place from the adapter, and when stores begin taking place again they will be aggregated normally, as described above. Note that receipt of a flush command is not a state, but rather an event, triggered (in one example) by the router becoming idle.

There are additional flush events which may be similarly processed. The aggregation processing described herein benefits from an adapter's using a set of descriptors which dictate ranges of memory/addresses it may use for the data stores. A descriptor return (i.e., a release of ownership) by the adapter signals a forced discontinuity, since it indicates that there will be no further data being stored for that particular memory range. The event of the descriptor return is serialized with stores from the adapter. In one embodiment, the aggregator considers the descriptor return a flush command.

The aggregator can also arbitrate a third, external flush event received, for example, from higher-level control mechanisms. In one embodiment, this third, external flush event might facilitate error recovery, or could be employed for any other purpose deemed necessary by the higher-level control. Over-use of such an external flush event would only result in loss of the enhanced performance described herein due to a lack of aggregation.

Figure 6:
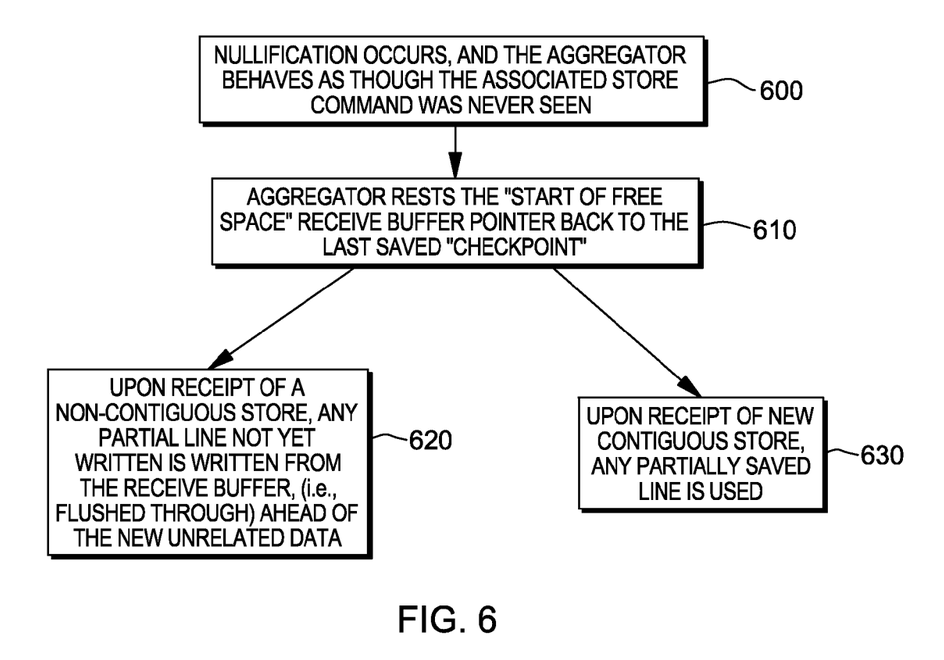
FIG. 6 depicts one embodiment of nullification processing which may be employed in combination with aggregation processing of FIG. 4, in accordance with one or more aspects of the present invention.

FIG. 6 illustrates one embodiment of nullification processing. A store command undergoes nullification when that store is poisoned by some mechanism (e.g., an application-specific mechanism), or otherwise fails an integrity check, and may or may not be resent/retried by the adapter. A nullification of an otherwise contiguous store is not considered a discontinuity in the active aggregation effort, since the nullification requires the aggregator to behave as though the associated store command was never seen. Thus, following nullification, the aggregator can continue waiting for another potentially contiguous store 600. The aggregator saves a current "start of free space" pointer as a "checkpoint" at the start of each write to the receive buffer, regardless of whether that write is a fresh write or the contiguation of an in-progress aggregation. Upon seeing a nullification, the aggregator resets the "start of free space" receive buffer pointer back to the last saved "checkpoint" 610. If a new contiguous store then arrives, any saved partial line is used again 620. If a non-contiguous store next arrives, any partial line not yet written must be written from the receive buffer (i.e., flushed through) ahead of the new, unrelated data 630.

In a protocol that makes use of the concepts of header credits for managing receive buffer space (such as PCIe), aggregation processing such as described herein also allows header credits to be reused more efficiently. It is likely that only the router knows when some piece of memory in the receive buffer is no longer needed, and thus the release of header credits generally depends on signals from the router. However, combining multiple stores into a single contiguous write to the receive buffer allows the aggregator to return one or more header credits to the adapter immediately for any stores that are successfully aggregated with one or more prior stores. This special immediate return of header credits by the aggregator itself is, in one embodiment, arbitrated within the aggregator with the normal return of credits that result from the routers having serviced the validated headers. Note that only the first store in a series of aggregated stores holds a header credit, which is later returned by the router. Thus, the aggregator can immediately release all other header credits. Combining stores, and thereby effectively tying up fewer header credits, results in improvement in receive buffer usage. Avoiding a receive buffer overflow may be ensured by other mechanisms, as would be understood by one skilled in the art.

Figure 7:
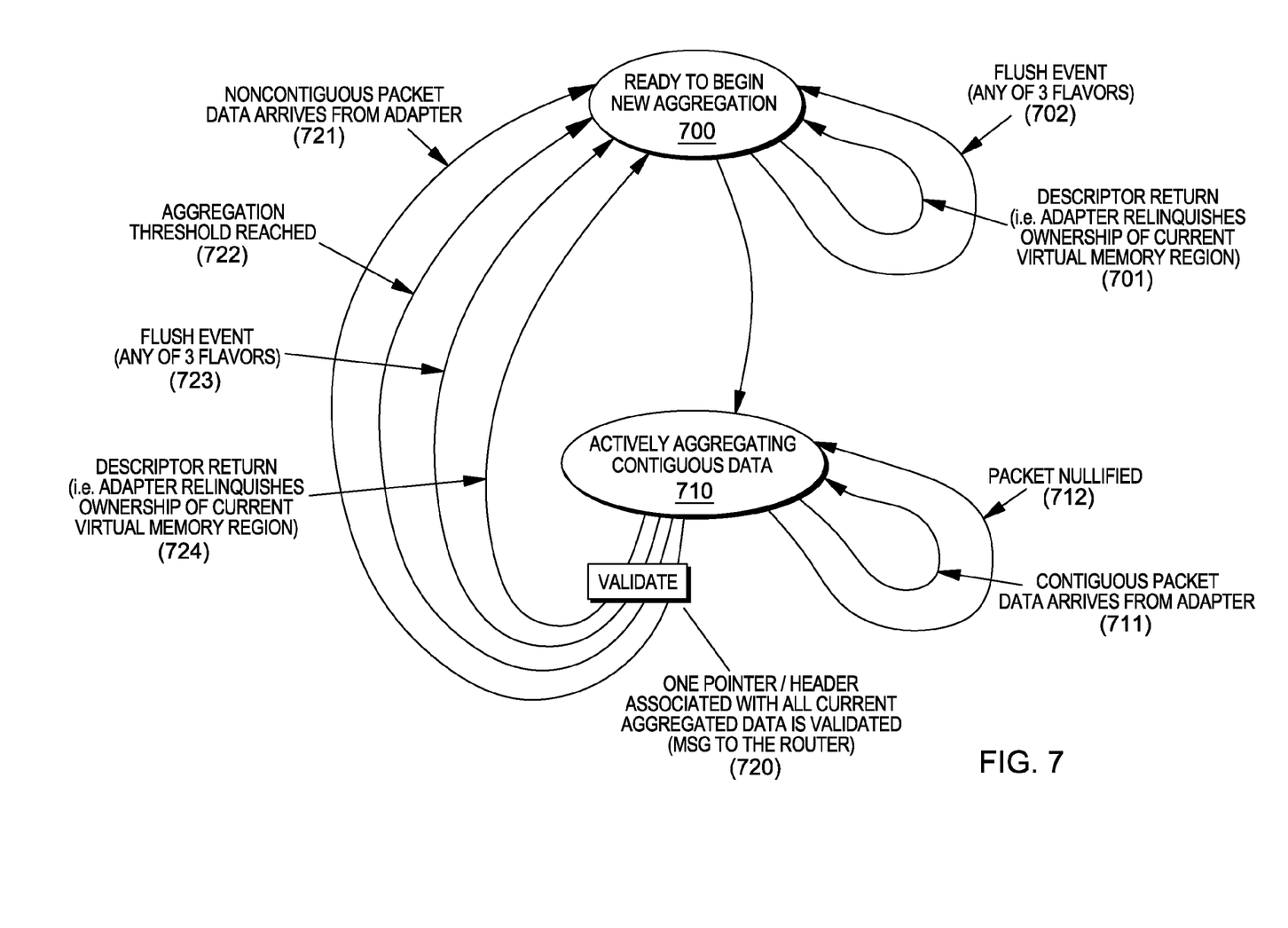
FIG. 7 is a diagram further illustrating one embodiment of aggregation processing, in accordance with one or more aspects of the present invention.

FIG. 7 is an overview of the above-described aggregator processing. Assuming that the aggregator receives a new data packet for processing as a new aggregation 700, the aggregator begins aggregating contiguous data 710 and remains aggregating the contiguous packet data as it arrives from the adapter 711. Further, the aggregator remains actively aggregating contiguous data notwithstanding a data packet nullification 712, as explained above. Upon completion of the aggregation, one pointer/header associated with all the aggregated data units is validated 720, that is, a message is forwarded to the router. The single store command associated with the aggregated data block can be validated if a non-contiguous packet of data arrives from the adapter 721, or the aggregation threshold (i.e., configurable limit) is reached 722. In addition, aggregation of a current contiguous block of data can terminate with one of the above-described flush events, or a descriptor return, where the adapter relinquishes ownership of a current virtual memory region 724. In the ready to begin new aggregation stage 700, the aggregator may receive a descriptor return 701, wherein the adapter has relinquished ownership of the current virtual memory region, as well as any of the above-described flush events 702, any of which causes the aggregator to remain ready to begin a new aggregation 700.

Figure 8:
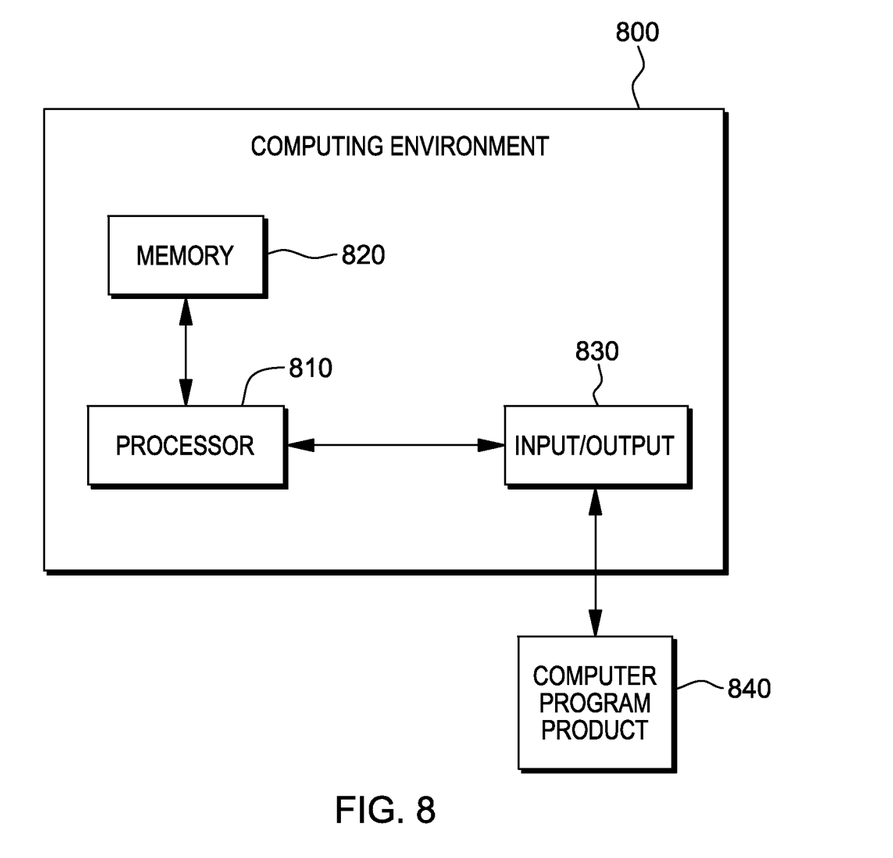
FIG. 8 depicts one embodiment of a computing environment which may include aggregation processing, in accordance with one or more aspects of the present invention.

FIG. 8 is a block diagram of an illustrative computer system for, for example, Ethernet virtualization of a router with aggregation facilities to facilitate flow of traffic to a virtual host. The system includes a computing environment 800 operatively provided with (in one example) a computer program product 840 via an input/output interface (I/O) 830. The computer program product may include a representation of instructions for router virtualization to facilitate flow of data packets to a virtual host, and may be implemented as, for example, information permanently stored on non-writable storage media (e.g., read-only memory devices within a computer, such as CD-ROM disks readable by a CD-ROM drive), alterable information stored on a writable storage media (e.g., floppy disk within a diskette drive or hard disk drive), information conveyed to a computer by a communications medium, such as through a computer or telephone network, including wireless or broadband communications networks, such as the Internet, etc.

The computing environment 800 includes one or more processors 810 that processes information for router virtualization employing aggregation processing, wherein the information is represented, for example, on the computer program product 840 and communicated to the computing environment 800 via the I/O interface 830, wherein the processor 810 saves information as appropriate into a memory 820. Illustratively, processor 810 may implement the aggregation processing described herein (in one embodiment).

As one example, the computing environment 800 may comprise one or more computer systems, each of which may include one or more components, such as illustrated in FIG. 8, and each computer system may have the same or different components than another computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

In one example, a computer program product includes, for instance, one or more non-transitory, computer-readable storage media to store computer-readable program code means or logic thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments illustrated were chosen and described in order to explain the principles of the invention and the practical application, and to enable others of ordinary skill in the art to understand the invention for various embodiment with various modifications as are suited to the particular use contemplated.

What is claimed is:

1. A network component comprising:
   a router comprising one or more virtual routers, the one or more virtual routers configured to perform a method independent of a timer, the method comprising:

receiving a plurality of data units to be routed, the plurality of data units being received in a data unit reception order;

identifying and concatenating, without modifying the data unit reception order, multiple contiguous data units of the plurality of data units into an aggregated data span, the aggregated data span being a span of contiguous data units of the plurality of data units to be routed, and the concatenating realigning one or more data boundaries of the multiple contiguous data units; and validating, independent of the timer, the aggregated data span for routing by the one or more virtual routers, the validating being triggered by the earliest of:

the aggregated data span reaching a size which with inclusion of a next contiguous data unit would result in the aggregated data span exceeding a set configurable size limit, or a next data unit in the data unit reception order of the plurality of data units being non-contiguous with the aggregated data span, the aggregated data span comprising at least two concatenated contiguous data units of the plurality of data units, or a flush command responsive to a non-time-based state of the router being received from the router or a control system external to the router.

2. The network component of claim 1, wherein the receiving comprises receiving a plurality of data packets, the plurality of data packets comprising the plurality of data units, and wherein the validating initiates routing of the aggregated data span using a common header command for the aggregated data span.

3. The network component of claim 1, wherein the concatenating occurs prior to an address translation associated with writing the plurality of data units to memory.

4. The network component of claim 1, wherein the receiving comprises receiving the plurality of data units into a receive buffer of at least one virtual router of the one or more virtual routers with no gap between the multiple contiguous data units, and the concatenating comprises deleting at least one pointer to at least one data unit of the multiple contiguous data units in the receive buffer, thereby realigning one or more data boundaries of the multiple contiguous data units.

5. The network component of claim 1, wherein the identifying comprises comparing addresses associated with the plurality of data units to identify contiguous addresses, and thereby the contiguous data units.

6. The network component of claim 1, wherein the validating comprises, responsive to the aggregated data span reaching a size which with inclusion of the next contiguous data unit would result in the aggregated data span size exceeding the configurable size limit, holding any partial line of data at an end of the aggregated data span while validating a balance of the aggregated data span for writing to memory, and concatenating the held partial line of data with the next contiguous data unit in a new aggregated data span, and repeating the concatenating and the validating for the new aggregated data span.

7. The network component of claim 1, wherein the configurable size limit is adjustable.

8. The network component of claim 1, wherein the flush command comprises one of a received flush command from an adapter, a descriptor return from the adapter which signals a forced discontinuity, or an external flush event from a higher-level control system.

9. The network component of claim 1, further comprising, prior to the validating, continuing to wait for another contiguous data unit to be concatenated with the multiple contiguous data units, and responsive to receiving a nullification notice for a current data unit, resetting a "start of free space" pointer in a receive buffer receiving the plurality of data units to a last saved "checkpoint" for further concatenating of contiguous data units.

10. The network component of claim 1, wherein the concatenating further comprises releasing at least one header credit to an adapter commensurate with concatenating two or more contiguous data units into the aggregated data span.

11. A computer program product comprising:

a computer-readable storage medium readable by a processor and storing instructions for execution by the processor to perform a method independent of a timer, the method comprising:

receiving, at a router comprising one or more virtual routers, a plurality of data units to be routed, the plurality of data units being received in a data unit reception order;

identifying and concatenating, without modifying the data unit reception order, multiple contiguous data units of the plurality of data units into an aggregated data span as the multiple contiguous data units are received, the aggregated data span being a span of contiguous data units of the plurality of data units to be routed, and the concatenating realigning one or more data boundaries of the multiple contiguous data units; and validating, independent of the timer, the aggregated data span for routing by the one or more virtual routers, the validating being triggered by the earliest of:

the aggregated data span reaching a size which with inclusion of a next contiguous data unit would result in the aggregated data span exceeding a set configurable size limit, or a next data unit in the data unit reception order of the plurality of data units being non-contiguous with the aggregated data span, the aggregated data span comprising at least two concatenated contiguous data units of the plurality of data units, or a flush command responsive to a non-time-based state of the router being received from the router or a control system external to the router.

12. The computer program product of claim 11, wherein the receiving comprises receiving a plurality of data packets, the plurality of data packets comprising the plurality of data units, and wherein the validating initiates routing of the aggregated span using a common header command for the aggregated data span.

13. The computer program product of claim 11, wherein the receiving comprises receiving the plurality of data units into a receive buffer of at least one virtual router of the one or more virtual routers with no gap between the multiple contiguous data units, and the concatenating comprises deleting at least one pointer to at least one data unit of the multiple contiguous data units in the receive buffer, thereby realigning one or more data boundaries of the multiple contiguous data units.

* * * * *